United States Patent [19]
Gyugyi

[11] 3,832,625
[45] Aug. 27, 1974

[54] ELECTRICAL POWER GENERATING ARRANGEMENT AND METHOD UTILIZING AN INDUCTION GENERATOR

[75] Inventor: Laszlo Gyugyi, Pen Hills, Pa.

[73] Assignee: Westinghouse Electric Corporation, Pittsburgh, Pa.

[22] Filed: Feb. 26, 1973

[21] Appl. No.: 336,140

[52] U.S. Cl. .................. 322/47, 322/20, 322/27, 322/32
[51] Int. Cl. ........................................ H02p 9/46
[58] Field of Search ............ 322/20, 25, 27, 47, 32; 310/171

[56] References Cited
UNITED STATES PATENTS
3,675,117  7/1972  Reimers ........................... 322/47 X

*Primary Examiner*—James D. Trammell
*Attorney, Agent, or Firm*—G. H. Telfer

[57] ABSTRACT

An output voltage wave having a desired amplitude and frequency is formed from selected portions of the AC signal generated by an induction generator. The selected portions of the generated signal are chosen in such a fashion as to establish the phase angle of the current drawn from the induction generator at a value that results in an appropriate excitation current being provided for the induction generator. Control arrangements are utilized to determine the required phase angle for the current drawn from the induction generator and to determine the portions of the generated signal that must be utilized to provide such a phase angle. Establishing the phase angle of the current drawn from the induction generator is accomplished without affecting the phase angle of the output current, which is determined by the load.

23 Claims, 6 Drawing Figures

ELECTRICAL POWER GENERATING ARRANGEMENT AND METHOD UTILIZING AN INDUCTION GENERATOR

BACKGROUND OF THE INVENTION

1. Field of the Invention

This invention relates primarily to an arrangement and method of utilizing an induction generator to produce power, and more specifically, this invention relates to an arrangement and method of providing an appropriate excitation current for an induction generator without the necessity of external systems or methods of varying the reactance of the load.

2. Description of the prior Art

The two basic types of presently used power generating systems both involve synchronous generators. In a first type of power generating system utilizing a synchronous machine, the speed at which the generator is driven is held constant, either by directly regulating the source of the driving power or by utilizing a constant speed drive to couple the shaft of the generator to the driving source. This, of course, means that the system is limited in the extent of its useful application as a result of the cost and equipment required.

In the other basic type of synchronous generator arrangement, the synchronous generator is driven at a variable speed. This, of course, means that the frequency of the synchronous generator output varies. To remedy this situation and provide the desired frequency signal, a static frequency changer converts the synchronous generator signal to an output signal with a precisely regulated frequency. This latter type of arrangement has the advantage of considerable design flexibility in view of the great degree of independence between the output frequency and the synchronous generator speed. In addition, this latter type of arrangement may also exhibit other desirable features such as: independently regulated output phase voltages which provide balanced output under unbalanced loading; precise current limitation under fault conditions; and fast transient response. However, in view of the fact that a synchronous generator is utilized, it has the disadvantages (also found in the former system) that it is limited in attainable operating speed and, in general, that it must be handled gingerly (relative to an induction machine) to preclude operating difficulties. In addition, synchronous machines, as compared to induction machines, are complex, large and expensive.

The advantages of simplicity, ruggedness, low cost, and the possibility of operating at high speeds have long been associated with squirrel cage induction machines. However, the inability of an induction generator, in the state of the art prior to this invention to provide reactive power has meant that squirrel cage induction machines have been primarily utilized only as motors. Although two types of induction generator systems have been previously employed, the disadvantages inherent in these systems have precluded any wide spread usages thereof. The problems involved in prior art induction generators are discussed on page 327 of the text "Alternating Current Machines" by Puchstein, Lloyd and Conrad, published by John Wiley & Sons, Inc., 1954, wherein it is indicated that the primary use of induction generators has been as braking devices.

The inherent difficulties of induction generators result from the fact that it cannot supply lagging loads; indeed it is necessary to provide laterally its own lagging or inductive excitation current. Inasmuch as the excitation current is the internal current drawn from the generator, the current drawn from the generator by the load must be leading or capacitive in order to balance the circuit and to establish the terminal voltage. One way of providing the lagging excitation current for the induction generator is to utilize an overexcited synchronous generator connected in parallel with the induction generator. Since most industrial loads draw current with a lagging power factor, it means that the overexcited synchronous generator, which essentially serves as a synchronous capacitor, must supply not only the lagging excitation current for the induction generator, but also the reactive (lagging) component of the load current. For this reason, and for the reason that the use of a synchronous generator to provide lagging reactive power negates many of the advantages of using an induction generator, this arrangement has little practical value.

The other type of prior art arrangement that has been devised for induction generators is to provide variable external capacitors as part of the load supplied by the induction generator. This approach has the advantage that it eliminates the need for an external source to provide the lagging reactive power needed for excitation of the induction generator. However, this solution is unattractive from both technical and economical viewpoints, since a complex control and switching arrangement is necessary to adjust the capacitors to provide the proper excitation for the induction generator. In addition, even though the excitation of the induction generator can be controlled in this fashion, with some difficulty, variations in the load requirements will vary the amount of slip that is needed to provide the real power requirements. This means that the frequency of the voltage supplied to the load will fluctuate, and thus means must be provided for adjusting the speed of the induction generator to maintain a constant frequency for the output voltage. As a result of these difficulties, the variable external capacitor control has found as little practical application as the use of an over-excited synchronous generator to provide the reactive power requirements.

SUMMARY OF THE INVENTION

In order to realize the inherent advantages of an induction generator and to overcome the difficulties of prior art arrangements for providing excitation current for the induction generator, the present invention involves an arrangement for providing appropriate excitation for an induction generator without the use of an external synchronous generator or external variable capacitors. In addition, the present invention produces an output voltage having a fixed frequency and amplitude, regardless of variations in the induction generator operation as a result of changing load requirement. To achieve these results, this invention utilizes the principles of a variable input power factor cycloconverter (or other frequency changers with familiar characteristics) as set forth in detail in U.S. Pat. No. 3,707,665, issued to Laszlo Gyugyi, entitled "Power Frequency Changer With Controllable Input Displacement Factor," and assigned to the assignee of the present invention. Inasmuch as this application explains in detail the operation of the variable input power factor cycloconverter, the operation of this device will be covered only to the extent necessary to explain the operation of the present invention.

Briefly, the present invention relates to an arrangement utilizing an induction generator that generates a signal, such as a set of phase displaced or polyphase voltages. The generated signal is conveyed to a signal handling circuit, such as a frequency changer or cycloconverter incorporating at least one bidirectional switch for each voltage phase (the term bidirectional switch, as utilized herein, refers to a controllable device capable of conducting current in both directions). The voltages passed by the bidirectional switches are combined to form an output voltage wave of the signal handling circuit having a desired frequency and amplitude, this output voltage being either single phase or multiple phase.

The output voltage of the signal handling circuit is then passed to an output filter, such as a predominantly capacitive LC filter. Inasmuch as the output voltage of the signal handling circuit is composed of portions of the generator signals, it is not a perfectly smooth waveshape and hence reference to the output voltage (or the output current) actually means the fundamental component thereof. The filter circuit serves to remove some of the ripple from the output voltage wave and make the output voltage more synonymous with the fundamental component. After passing through the filter circuit, the output voltage is applied to the load.

Operation of the bidirectional switches in the signal handling circuit is controlled by an adjusting arrangement that determines the amplitude and frequency of the output voltage and establishes the phase angle of the current drawn from the induction generator for excitation purposes, without affecting the phase angle of the output current, which is determined by the load. The adjusting arrangement utilizes two control systems, one to determine the phase angle of the current drawn from the induction generator and the other to determine the amplitude and frequency of the output voltage.

The controlling system that determines frequency and amplitude of the output voltage includes two modulating circuits which, from the induction generator voltages and the output voltage reference signal, determines the conduction intervals of the bidirectional switching elements so as to obtain the desired amplitude and frequency of the output voltage. Both of the modulator circuits produce pulses indicative of an output voltage having the desired amplitude and frequency, but a different portion of the voltages generated by the induction generator are utilized to form these output voltages, the modulator circuit outputs represent complementary rather than identical wave strips. The outputs of the modulator circuits and a signal from the other control system, which indicates the desired phase angle for the current drawn from the induction generator, are applied to an actuating circuit which utilizes pulses from the modulator circuits to control the opening of selected bidirectional switches. Which of the modulator pulses are utilized at any given time is determined by the signal from the other control system.

The control system that determines the phase angle of the current drawn from the induction generator adjusts this phase angle to cause the induction generator to operate in a desired fashion. In the particular embodiment disclosed in this application, the voltages generated by the induction generator are maintained at a given amplitude. This is achieved by comparing the actual amplitude of the voltages generated by the induction generator to a predetermined reference level for that amplitude. An error circuit, such as an error amplifier, produces a signal indicative of the difference which is applied at one input to a comparing circuit. The other input to the comparing circuit is a signal produced by a load current responsive circuit that indicates the frequency and phase of the output current, such as a sawtooth wave having a period corresponding to the half period of the output current. In the event that there is no load current, which is determined by a load current detecting arrangement, a signal simulating a capacitive output current is produced by integrating the output voltage reference signal. A gate circuit responsive to the load current detection arrangement passes the integrated output voltage reference signal to a summing circuit only when there is no load current. The other input to the summing circuit is an indication of the total output current as determined by an output current detection circuit. The output of the summing circuit is then applied to a wave forming arrangement which produces a sawtooth wave corresponding to either the actual or simulated output current.

The comparing circuit responds to the output of the error circuit and the wave forming circuit to produce a square wave output. The square wave output is also inverted so that a positive version of the square wave may be utilized to control the selection of pulses from one modulating circuit and the negative version of the square wave may be utilized to control the selection of pulses from the other modulationg circuit. If the output of the error circuit indicates that the voltage being generated by the induction generator has the proper amplitude, the phase angle established by the square wave output of the comparing circuit will establish the phase angle of the current drawn from the generator such as to maintain existing operation. However, if the output of the error circuit indicates that the generated voltage is not of the desired amplitude, the phase angle established for the induction generator will be such as to alter the excitation current in such a fashion as to appropriately correct for the disparity. Of course, alteration of the phase angle of the current drawn from the induction generator could also be altered in a trial and error fashion, but the approach utilized in the specific embodiment is particularly desirable.

It should be noted that while the power factor or phase angle of the current drawn from the induction generator may be varied without affecting the phase angle of the output current, which is established solely by the output loading (load and filter circuit), the phase angle of the output current must be known in order to determine the phase angle that the induction generator current will have for a given set of circumstances. Thus, the output current does provide a reference for determining the phase angle of the induction generator current, but with this reference the phase angles of the two currents can be established independently of each other.

In this fashion, the first commercially feasible induction generator arrangement has been provided. Thus, the advantages mentioned above of an induction generator, as opposed to a synchronous generator, may be realized. In addition, the problems involved in prior art attempts to make a successful induction generator system utilizing an external synchronous generator or external variable capacitor have been obviated. Further, the output voltage may be held at a fixed frequency regardless of the speed at which the induction generator is driven, so that the advantages of this new induction generator arrangement are even greater. In essence, this arrangement has all the advantages of a synchronous generator system utilizing a frequency changer, in addition to all the advantages of an induction gneerator. No external exciter of any kind is required for the induction generator and the system can supply large lagging power factor loads and short circuits, as well as providing very fast response to transient load changes.

This new arrangement has particular significance with respect to mobile ground and air borne variable speed, constant frequency power generating systems in which the generators, which are driven from turbines and jet engines, are usually required to operate at as high a speed as possible in order to eliminate gear boxes and/or to reduce the electromagnetic weight of the generator. In view of the high driving speeds for the induction generator that may be employed in the arrangement of this invention, this invention is a significant breakthrough for these mobile power generating systems, as well as for many other usages. It should be especially noted all of these advantages are achieved without increasing the rating or the number of the bidirectional switches over that which would be employed with a prior art synchronous generator system having a frequency changer.

The foregoing and other objects, advantages and features of this invention will hereinafter appear, and for purposes of illustration, but not of limitation, an exemplary embodiment of the subject invention is shown in the appended drawing.

DETAILED DESCRIPTION OF THE PREFERRED EMBODIMENT

To aid in understanding the present invention, a brief review of the induction machine may be helpful. In an induction motor, an alternating current (AC) field applied to the stator produces a rotating flux that circulates about the circumferential stator at a speed (referred to as the synchronous speed) determined by the frequency of the AC field. This rotating flux induces a voltage in the squirrel cage winding of the rotor, which results in the production of a torque as a result of the interaction between the rotating flux of the stator and the current in the squirrel cage winding. As the torque is produced on the rotor, it will begin to rotate. Obviously, if the rotor were to rotate at synchronous speed, there would be no change of flux in the squirrel cage winding and hence no induced voltages. The difference between synchronous speed and the actual speed of rotation of the rotor is normally expressed as the "slip." The greater the slip, the greater will be the induced voltage and, up to a certain point, the greater the torque produced. In addition, increases in the slip also increases the reactance of the rotor winding and hence the magnitude of the lagging current. As the load is increased, the rotation of the rotor will be decreased, and the resulting increase in the slip will provide the desired increase in torque.

With respect to a squirrel cage induction generator, the same type of operation is involved, except that the slip must now be negative. In other words, when an induction motor rotor is rotated at speeds greater than synchronous speed, an induction generator will be the result. As in the case of the induction motor, the amount of power generated will be a function of the slip and, since the lagging current requirement is now in the stator winding rather than in the rotor winding, the magnitude of the slip will be a function of the size of the lagging phase angle of the current in the induction generator stator winding. It is in the control of this phase angle that prior art attempts to construct a practical induction generator have failed. One other point that should be borne in mind during the following discussion is that a lagging phase is required for the internal current of the induction generator. This means that the current sent to an external load from the terminals of the generator must have a leading phase angle in order to balance the lagging phase angle of the internal generator current.

Figure 1:
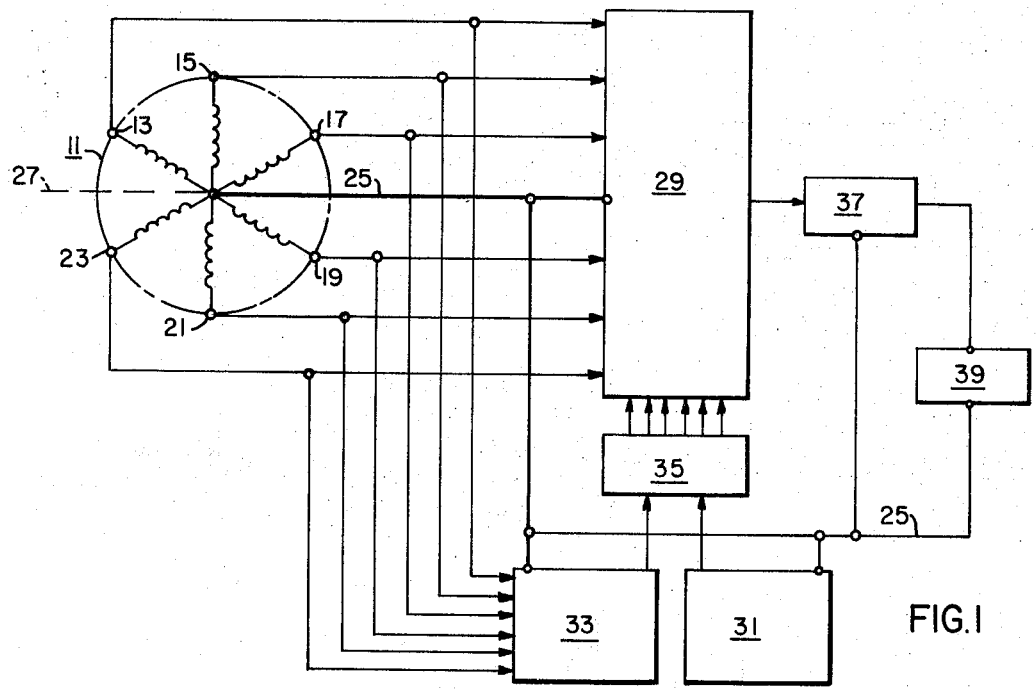
FIG. 1 is a block diagram of a preferred embodiment of the present invention.

With reference now to FIG. 1, a squirrel cage induction generator 11 is schematically illustrated. Although this description is made with respect to a squirrel cage induction generator, inasmuch as this type of induction generator is particularly useful, it should be recognized that the description is equally applicable to any induction or asynchronous generator (such as a wound rotor induction machine or even to permanent magnet generators). The particular generator 11 utilized in this preferred embodiment is a six-phase arrangement for generating the induction generator signals. Thus, the induction generator signal in this case would include a set of six mutually displaced phase voltages appearing between the terminals 13, 15, 17, 19, 21 and 23 and the neutral terminal 25. Of course, induction generator 11 is not restricted to a six-phase output and may include any number of phase displaced signals, even, conceivably, in some cases, a single phase generated voltage. Generator 11 is driven by a constant or a variable speed shaft 27.

The outputs of induction generator 11 are fed to a signal handling circuit 29. Signal handling circuit 29 is a frequency changer or cycloconverter that can provide a variable input power factor (i.e., a variable phase angle for the current it draws form the generator), while forming an output voltage having a desired amplitude and frequency. In establishing the input power factor, or the phase angle of the current drawn from the induction generator 11, signal handling circuit 29 sets the phase angle of the current drawn from the generator without affecting the phase angle of the output current.

A first control means 31 is utilized to control the establishment of the phase angle of the current drawn from induction generator 11. Control circuit 31 causes the phase angle of the current drawn from induction generator 11 to be determined in such a fashion as to insure that induction generator 11 is excited to generate a signal that permits the signal handling circuit 29 to produce an output voltage having the desired frequency and amplitude. This is achieved by causing the current drawn from the induction generator to have a leading phase angle of such a magnitude that the induction generator 11 produces a terminal voltage of the magnitude necessary to produce the desired output.

A second control circuit 33 controls the amplitude and frequency of the output voltage. Signals from control circuits 31 and 33 are passed to an actuating circuit 35 which, in response to the signals from the control circuits 31 and 33, energizes the signal handling circuit 29 to provide the appropriate output voltage and the necessary phase angle for the current drawn from the induction generator 11.

The output voltage produced by signal handling means 29 is then applied to a filter circuit 37. Filter circuit 37 smooths the ripple of the output voltage produced by the signal handling circuit 29. The filtered output voltage is then passed to a load 39.

Figure 2:
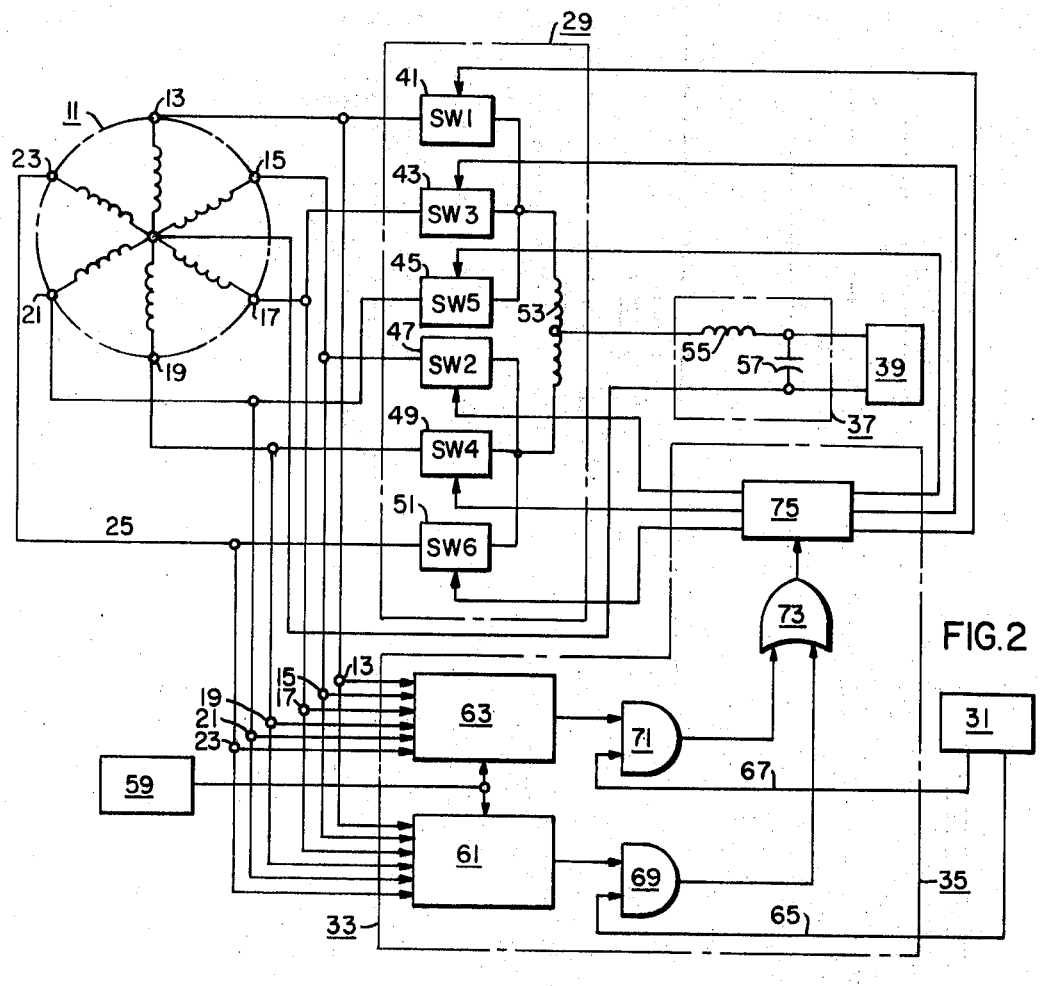
FIG. 2 is a more detailed illustration of the preferred embodiment shown in FIG. 1.

A more detailed diagram of the arrangement of this invention is illustrated in FIG. 2. In this figure it may be seen that the signal handling circuit 29 includes a series of bidirectional switches 41, 43, 45, 47, 49 and 51. Each of the bidirectional switches is associated with a corresponding one of the polyphase voltages generated by induction generator 11. Although the bidirectional switches 41, 43, 45, 47, 49 and 51 may be any appropriate type of device, in this preferred embodiment they are solid state power switches. The outputs of the bidirectional switches appear across an output coil 53. The output voltage of the signal handling circuit 29, which is taken from the midpoint of coil 53, is then applied to the filter circuit 37. As may be seen, filter circuit 37 is an LC circuit with an inductor 55 and a capacitor 57. The values of these elements are chosen in such a fashion that the filter 37 has a loading effect that is essentially capacitive.

An output voltage reference generator 59 applies a signal to control circuit 33 that is indicative of the amplitude and frequency desired for the output voltage. The output voltage reference signal is applied to two modulation circuits 61 and 63, each of which uses the voltages generated by induction generator 11 and the output voltage reference signal to generate signals to operate bidirectional switches 41, 43, 45, 47, 49 and 51. The operating principles and practical circuits of modulators 61 and 63 are conventional in the cycloconverter art (e.g., sine wave crossing control, integral control, phaselocked oscillator control, etc.) and will not be discussed in detail herein. (Such circuits are described in U.S. Pat. No. 3,431,483 issued to D. L. Lafuze on Mar. 4, 1969; and U.S. Pat. No. 3,585,486 issued on June 15, 1971; and in the text "Thyristor Phase-Controlled Converters and Cycloconverters" by B. R. Pelly, published by John Wiley & Sons, Inc., 1971.) Suffice it to say that as a result of this modulation, the modulators 61 and 63 produce pulses representative of waveforms B and C in FIG. 3. (Hereinafter the various waveforms will be identified by Figure number and letter designation in the figure, e.g., waveforms 3B and 3C.) In other words, if only the pulses from modulator 61 were applied to actuating means 35, the waveform labeled B in FIG. 3 (waveform 3B) would be the output voltage of the signal handling circuit 29. Similarly if only pulses from modulator 63 were applied to actuating means 35, the waveform labeled C in FIG. 3 (waveform 3C) would be the output voltage of signal handling circuit 29. As may be seen from the waveform 3B and 3C, the output voltage is formulated from selected portions of the voltages generated by induction generator 11. For ease of reference, these voltages have been identified in waveform 3B by the numbers identifying the terminals of induction generator 11 from which they are obtained. Both waveforms 3B and 3C have the same fundamental component, the amplitude and frequency of which is determined by the output voltage reference signal illustrated as waveform A in FIG. 3 (waveform 3A).

Although the fundamental components of the waveforms 3B and 3C are identical, it should be noted that the portions of the individual voltages generated by induction generator 11 that are utilized to construct the waveforms differ. As described in the above-identified U.S. Pat. No. 3,707,665, waveforms 3B and 3C, and hence the outputs of modulators 61 and 63, are actually complementary. In other words, regardless of the output load the input power factor (phase angle of the current drawn from induction generator 11) is always leading with the maximum attainable phase angle if the output wave is composed of waveform 3B during the positive half cycles of the output current and of waveform 3C during the negative half cycles of the output current. Conversely, the input power factor (phase angle of the current drawn from induction generator 11) is always lagging if the output wave is composed of waveform 3C during the positive half cycles of the output current and of waveform 3B during the negative half cycles of the output current. Therefore, the input power factor is approximately unity if the output voltage wave is composed half of waveform 3B and half of waveform 3C during each half period of the output current (i.e., the changeover from one waveform to the other takes place at the peak of the output current wave).

Figure 3:
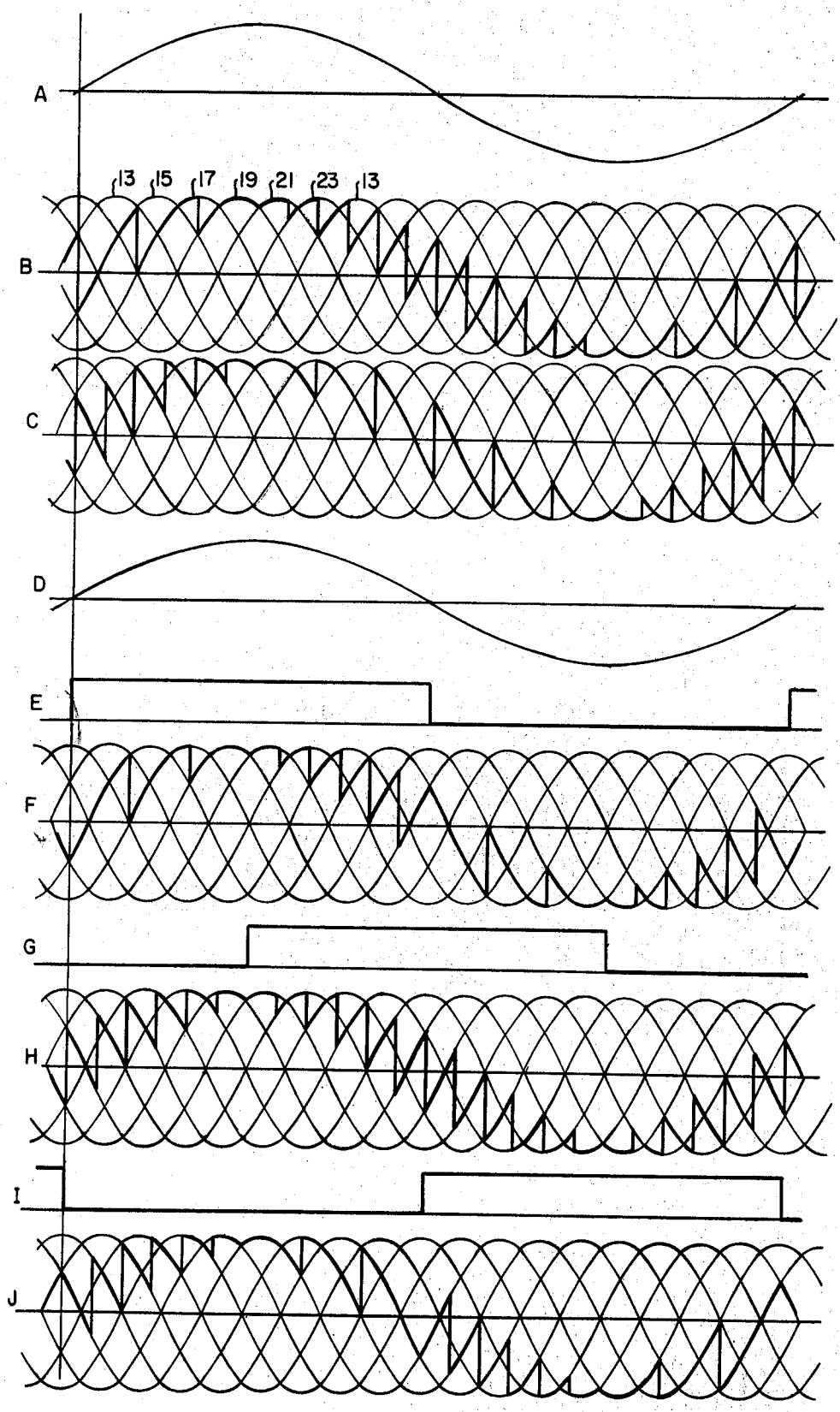
FIG. 3 is a series of waveforms illustrating the voltages and currents at various points in the diagram of FIG. 2 under various operating conditions.

The just described conditions may be better understood by reference to the other waveforms of FIG. 3, but before doing so attention is briefly directed again to the structure of FIG. 2. There it may be seen that the first control means 31 has output signals on lines 65 and 67 which are also conveyed to the actuating circuit 35. The signals on lines 65 and 67 are square waves, the square wave on line 67 being the inverse of the square wave on line 65. The square wave on line 65 and the output of modulator 61 are both applied to an AND gate 69. Thus, when the square wave on line 65 is positive the pulses that will be controlling the fabrication of the output voltage wave are those from modulator 61. Similarly, when the square wave on line 65 is negative, and the square wave on line 67 is positive, the pulses that will control the fabrication of the output voltage wave will be those from modulator 63. This selection is made by applying the square wave on line 67 and the output of modulator 63 to a second AND gate 71. The outputs of AND gates 69 and 71 are then conveyed to an OR gate 73, which conveys the chosen signals to a firing pulse generator 75. Firing pulse generator 75 then produces appropriate firing pulses for the individual bidirectional switches 41, 43, 45, 47, 49 and 51.

Turning back now to FIG. 3, it may be seen from waveform 3D that an output current having a zero phase angle (i.e., the output current is in phase with the output voltage) has been chosen. With such an in phase output current, if the control circuit 31 produces a square wave on line 65 that is in phase with the output current the resulting output voltage waveform is that illustrated in FIG. 3F. Since its output voltage waveform is composed of waveform 3B during the positive half periods of the output current, and of waveform 3C during the negative half periods of the output current, the phase angle of the current drawn from the induction generator is maximum and leading. With such a unity power factor load the theoretical value of this phase angle is 32.5°. (It should be noted that the range or maximum value of the input power factor increases as the load power factor decreases, i.e., the load becomes more reactive.)

In waveform 3G, there is shown a square wave output on line 65 that is displaced 90° with respect to the output current. This means that the transition of this square wave occurs at the peaks of the output current. As previously indicated, such a mode of operation results in a unity input power factor, i.e., the current drawn from the induction generator 11 is in phase with the voltage generated by the generator 11. The resultant wave produced by signal handling circuit 29 is shown in waveform 3H. An analysis of waveform 3H would reveal that the current segments drawn from terminals 13, 15, 17, 19, 21 and 23 include a number that lead the voltage produced at the corresponding terminal and a number that lag the voltage produced at the corresponding terminal. When added over a full period, the leading current component and the lagging current component would cancel to produce an average virtually identical to the result if each of the individual current components were in phase with its corresponding voltage. By the same token, an analysis of the individual current components of waveform 3F would show that these components all lead the corresponding voltages so that the resultant average is equivalent to a leading current drawn from the induction generator 11.

Waveform 3I illustrates the case where the square wave output on line 65 is 180° displaced with respect to the output current. With such a signal on line 65 (and the inverse, of course, on line 67), the resultant output waveform 3J has all lagging current components and the average is a maximum lagging input power factor. As in the case of waveform 3F, the theoretical magnitude of this maximum lagging phase angle for the current drawn from induction generator 11 is 32.5°, when the output current is in phase with the output voltage.

In essence, then, the input power factor, or the phase angle of the current drawn from the induction generator, may be determined by averaging the leading and lagging current components that are drawn from the terminals 13, 15, 17, 19, 21 and 23. It should be noted that in any such analysis, the phase of the output current will affect the result, since the current drawn from each of the terminals 13, 15, 17, 19, 21 and 23 has to provide a current with the polarity required by the output current. For example, if the output current of waveform 3D was shifted to the right, so that it lagged the voltage of waveform 3A by some angle, the first few current components would have to have a negative polarity (up to the point that the current waveform of 3D reached the crossover point). In such a case, and taking waveform 3H as an example, it would be seen that the first few current components would then be negative if the corresponding voltages remained positive in polarity. Thus, these current components would appear as lagging in waveform 3H would then appear as leading the corresponding voltage. Of course, a leading current component, such as the first few in waveform 3F, would then appear as a lagging current. Therefore, even though the input power factor, or phase angle of the current drawn from induction generator 11, may be set independently of the phase angle of the output current, the phase angle of the output current will affect the setting needed to obtain the desired induction generator current phase angle and will limit the extent or range of the phase angle of the current drawn from the induction generator that can be realized. Thus, it is desirable to know the phase angle of the output current so that the square wave on line 65 may be accurately set to determine the desired input power factor. Nevertheless, of course, the phase of the square wave on line 65 could be determined on a trial and error basis.

Figure 4:
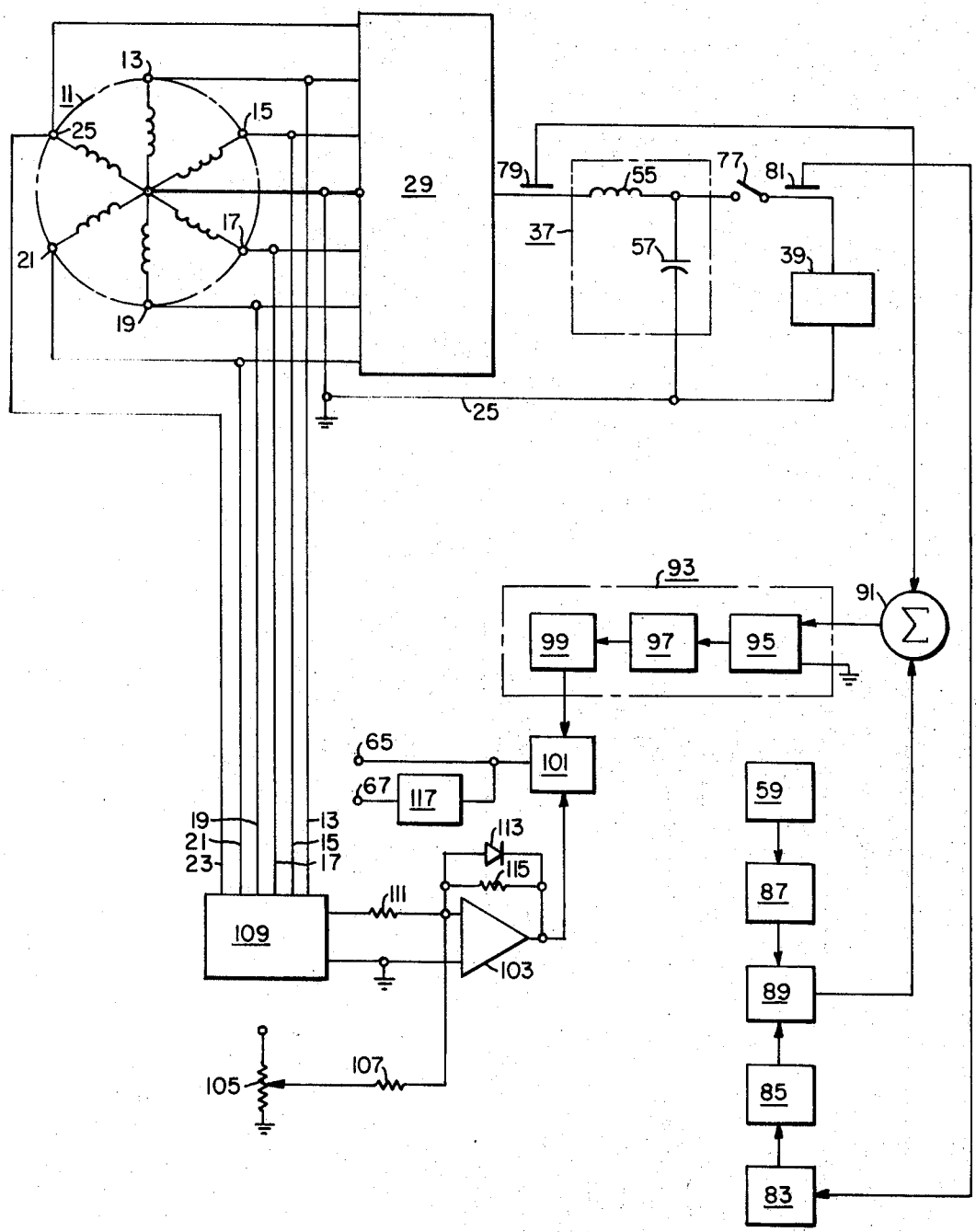
FIG. 4 is a more detailed view of a portion of the preferred embodiment illustrated in FIGS. 1 and 2.

A preferred embodiment of the first control system, which determines the input power factor that will be produced by appropriate phase positioning of the square wave on line 65 (and the inverse thereof, on line 67), is illustrated in FIG. 4. As may be seen in FIG. 4, a switch 77 has been indicated between filter circuit 37 and load 39 to aid in describing the operation of the control system 31.

An output current sensor 79 is connected to measure and provide an indication of the total output current obtained from the signal handling circuit 29. A load current detection arrangement includes a load current sensor 81 located beyond the filter circuit 37 and adapted to measure and provide a signal indicative of the current actually supplied to load 39. The load current detection arrangment also includes a rectifier circuit 83 and a null detector 85. Rectifier circuit 83 rectifies the load current signal produced by the load current sensor 81, and null detector 85 converts the rectified signal into a desired gate control signal.

An integrator circuit 87 is utilized to integrate the output of the voltage reference generator 59. The output of integrator circuit 87 thus simulates a leading or capacitive load current. The output of integrator circuit 87 is passed through a gate circuit 89. Gate circuit 89 blocks passage of the simulated capacitive current from integrator circuit 87, unless the output of null detector 85 indicates the absence of a load current. When there is no load current, gate circuit 89 passes the simulated capacitive current from integrator circuit 87 to a summing circuit 91. The other input to summing circuit 91 is obtained from the output current sensor 79.

The output of summing circuit 91 will thus be a combination of the detected output current as reflected by sensor 79 and the simulated capacitive current from integrator circuit 87. Of course, when there is any load current at all, gate circuit 89 will be closed and the output of summing circuit 91 will just be the signal provided by sensor 79 indicative of the total output current. The output of summing circuit 91 is applied to a wave forming circuit 93.

Figure 5:
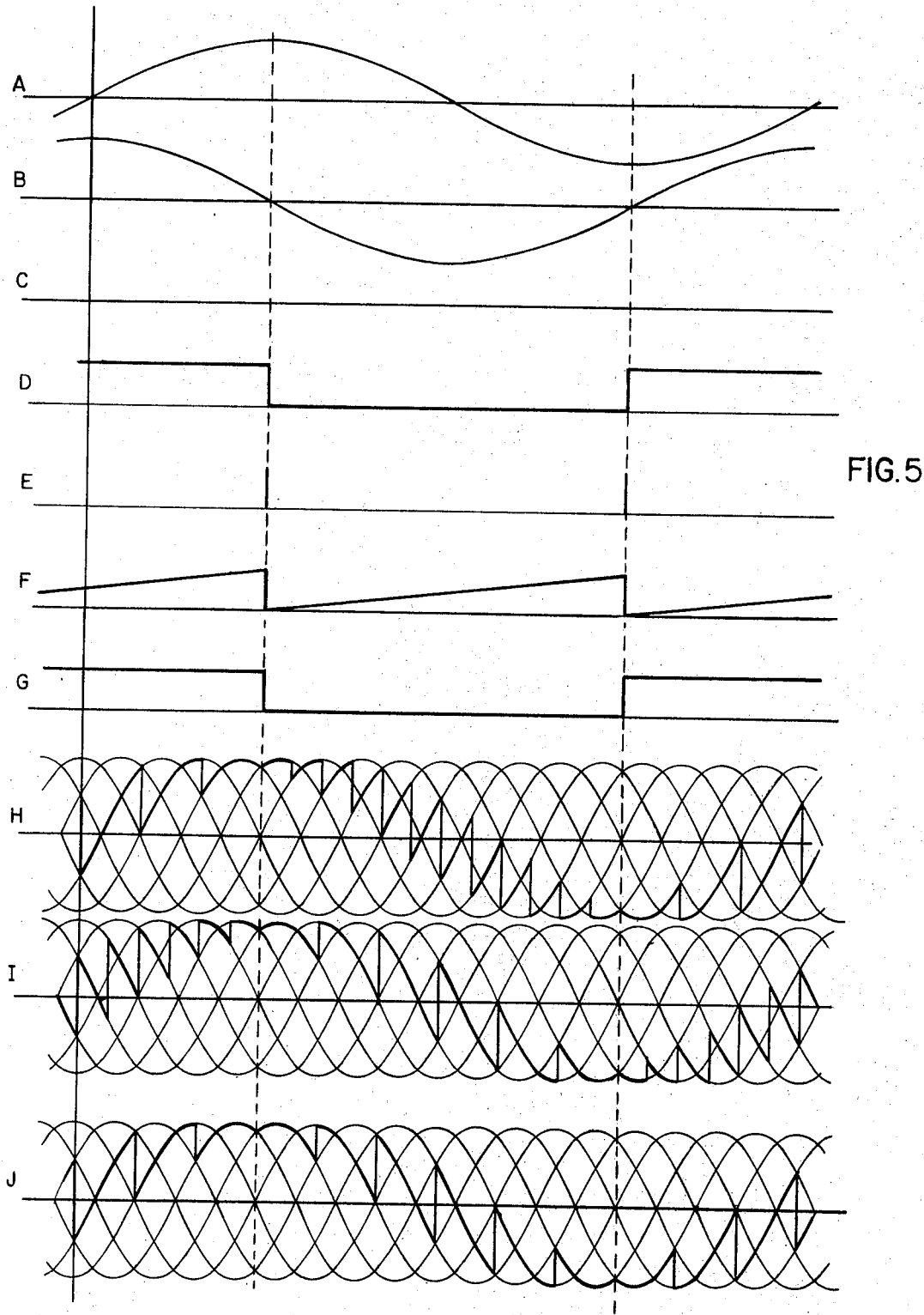
FIG. 5 is a series of waveforms illustrating the voltages and currents at various points in the diagrams of FIGS. 2 and 4 for various operating conditions.

Wave forming circuit 93 produces a sawtooth waveform of the type illustrated in waveform F of FIG. 5. (As in the case of the waveform of FIG. 3, the waveforms of FIG. 5, and also those of FIG. 6, will hereinafter be identified by the number of the figure and the letter of the waveform, e.g., 5F.) The production of the sawtooth wave is accomplished by means of a null detector 95, a pulse forming circuit 97, and a sawtooth generator 99. Null detector 95 responds to the output of summing circuit 91 to produce a square wave having half periods corresponding to the half periods of the actual or simulated current represented by the output of summing circuit 91. The output of null detector 95 is illustrated in waveform 5D.

The output of null detector 95 is then passed to pulse forming circuit 97, which produces pulses such as those illustrated in waveform 5E. These pulses are produced at the transition points of the square wave from null detector 95, which corresponds to the crossover points of the current indicative signal from summing circuit 91.

From pulse forming circuit 97 the pulses are conveyed to a sawtooth generator 99, which produces the sawtooth of waveform 5F. This sawtooth waveform has a period corresponding to the distance between the pulses produced by pulse forming circuit 97, which corresponds to a half period of the output current indicative signal from summing circuit 91. This sawtooth wave is then applied to a comparing circuit 101.

Comparing circuit 101 is a conventional comparator that also receives a signal from an error circuit, such as an error amplifier 103. Error amplifier 103 provides a signal indicative of the difference between a desired amplitude of the signal generated by induction generator 11 and the actual amplitude of that signal. The desired amplitude is given as a positive potential level by a potential level reference source 105. The positive potential level reference signal is conveyed to error amplifier 103 through a resistor 107. The actual amplitude of the signal generated by induction generator 11 is determined by a rectifier circuit 109, which produces a negative potential level signal indicative of the actual amplitude. This signal is conveyed to error amplifier 103 through a resistor 111. The difference between the positive signal from the reference source 105 and the negative signal from the rectifier circuit 109 causes the error amplifier 103 to produce a DC potential level signal. For maximum error, a "zero" output is provided, while for zero error a positive output potential is produced. An appropriate feedback circuit comprising a diode 113 and a resistor 115 is provided for error amplifier 103.

Thus, a positive DC potential at some level ranging from zero to a maximum level is applied to the comparator circuit, along with the sawtooth wave. The comparator circuit will then produce an output square wave on line 65, the transition points of which will be determined by the intersections of the output from error amplifier 103 and with the sawtooth waveform produced by waveform circuit 93. The output of comparator circuit 101 and the relationship thereof to the input signals is best illustrated by waveforms 5F and 5G and waveforms 6F and 6G. The phase displacement of the square wave output of comparing circuit 101 is indicative of the input power factor, or phase angle of the current drawn from induction generator 11, that is required to excite induction generator 11 in such a fashion as to generate a signal having the amplitude determined by reference source 105. The inverse of this square wave input is provided by passing the square wave output on line 65 through an inverting circuit 117 to provide the inverse, or opposite polarity, square wave signal on line 67.

With the control circuit just described, an arrangement has been provided that solves the problems associated with operating during starting and no load conditions. During starting, it is of course necessary to begin some current flow in order to provide excitation for induction generator 11. Without excitation, no voltage would be induced and no current would flow. However, it has been experimentally determined that there is some magnetic remanence in the induction generator which is sufficient to generate an initial small voltage upon rotation of the induction generator through the action of shaft 27. Of course, even if this remanence did not exist, or if it is desired to supplement the initial small voltage that is generated, a single current pulse through the stator windings would suffice.

The other apparent inherent problem involving no load operation also has a "natural" solution. At first it would seem that no load operation would be impossible, since no current would be drawn to provide excitation for induction generator 11. However, an output filter such as filter circuit 37 is always required to remove the ripple that results from the operation of a frequency changer, such as single handling current 29. Thus, even during no load circumstances, the induction generator and frequency changer 29 are actually loaded by the filter circuit. In addition, there is an input voltage suppression network (capacitive input filter) that is usually required for safe operation of the semiconductor switches that are utilized in a static frequency changer such as signal handling circuit 29. (This input filter is not shown herein.) Thus, the conditions required for operation under no-load conditions would be automatically satisfied if the output current to filter circuit 37 (multiplied by a conversion factor characterizing the frequency changer 29, typically equal to or greater than 0.83) plus the current to the input voltage suppression network (not shown) is equal to or greater than the no-load excitation current of induction generator 11 at minimum operating speed. For practical systems, there is usually no difficulty in meeting these criteria.

The small voltage generated during start-up, with the attendant small output current, makes operation of control circuit 31 somewhat indeterminant. Also, it is desired to provide maximum excitation for the induction generator 11 during this period. Further, it would be desirable to provide maximum excitation for the induction generator during no-load conditions. Thus, during start-up and no-load operation, the simulated capacitive current from integrator circuit 87 is passed to summing circuit 91. At start-up the current sensed by output current detector 79 would be essentially zero, while under no-load conditions the output current would be essentially in-phase with the simulated current (since LC circuit filter 37 is primarily capacitive). Therefore, in both instances, the current indicative signal at the output of summing circuit 91 would be indicative of a capacitive or leading current. The waveforms of FIG. 5 illustrate the operation during start-up, which would be essentially identical to that during no-load operation. Waveform 5A is a voltage reference and waveform 5B is the simulated capacitive output current which leads the output voltage by a phase angle of 90°. Waveform 5C is the actual output current, shown as zero during start-up. Waveform 5D illustrates the square wave produced by null detector 95 in response to the output of summing circuit 91, while waveform 5E illustrates the pulses produced by pulse forming network 97 in response to the 5D waveform applied to it by null detector 95. The sawtooth waveform of sawtooth generator 99 is illustrated in waveform 5F. Since the error between generated voltage and reference voltage is maximum, the output of error circuit 103 is zero, and thus the square wave output of comparing circuit 101 has half periods corresponding to the periods of the sawtooth waveform 5F. Thus, the square wave of waveform 5G is in phase with the simulated output current of waveform 5B.

Waveforms 5H and 5I are waveforms that would be produced by modulators 61 and 63, respectively, and correspond to waveforms 3B and 3C. Since the output of modulator 61 is utilized when the square wave output of comparator 101 is positive, (waveform 5G), while the output of modulator 63 is utilized when waveform 5G is negative (and the square wave output of inverting circuit 117 is positive), the previous discussion of the waveforms of FIG. 3 indicates that the input power factor should be maximum and leading. Reference to the output voltage waveform 5J indicates that this is the case. During the first quarter period of waveform 5J, the output current is positive and the current components utilized are leading with respect to the corresponding voltage waves. In the second quarter period, the current components utilized would be lagging with respect to the corresponding voltages if the current drawn were of the same polarity as the voltages. However, during this quarter period, the output current is negative and thus the current components actually appear to be leading the corresponding voltages. During the third quarter of the period, the current components utilized again appear as leading for the negative voltages, and since the output current is negative during this quarter period, these current components are actually leading also. Then in the fourth quarter period the current components again appear to be lagging their corresponding voltages, but since the output current is positive while the voltages utilized are negative, these current components actually lead their corresponding voltages. Thus, it may be seen that the current drawn from induction generator 11 is actually leading the generated signal at the maximum obtainable phase angle.

Figure 6:
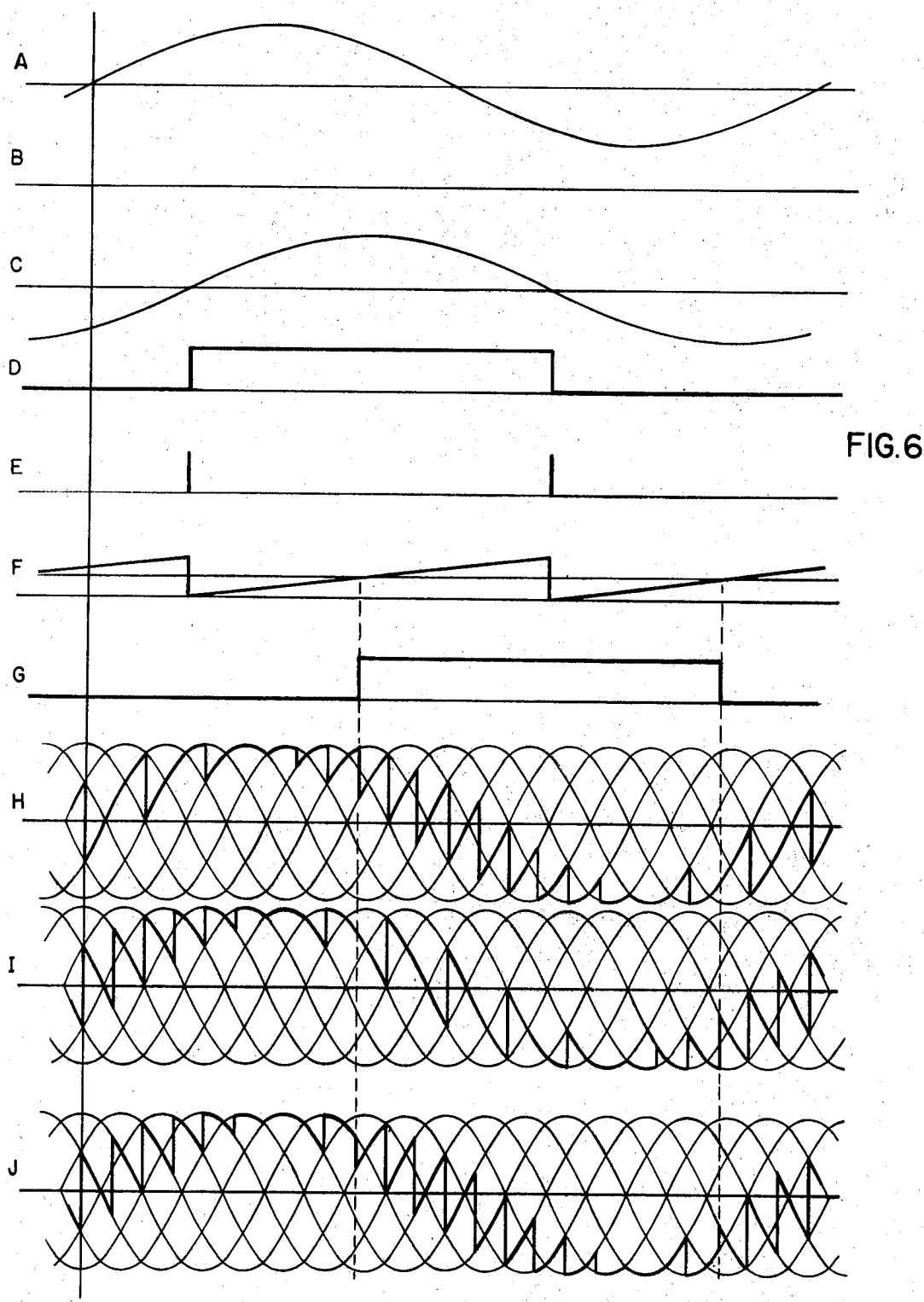
FIG. 6 is a series of waveforms illustrating the voltages and currents at various points in the diagrams of FIGS. 2 and 4 for various operating conditions.

With reference now to FIG. 6, the operation of the invention disclosed herein may be described for normal operating conditions. In such a situation, the switch 77 would be closed and the load would be provided with power from frequency changer 29. Since a load current would be drawn, gate 89 would be closed to the simulated output current from integrator 87, and the output of summing circuit 91 would be the actual output current. For purposes of illustration, an output current that lags the output voltage of waveform A by a phase angle of approximately 40° is shown in waveform 6C. As previously described in connection with FIG. 5, the waveforms 6D, 6E and 6F illustrate the steps leading to the sawtooth waveform of 6F that has periods corresponding to half periods of the output current. Also, waveform 6F illustrates a non-zero output for error amplifier 103, since it is assumed that the generated voltage of induction generator 11 is at or near the desired amplitude. As may be seen in waveform 6G, the output of comparator 101 on line 65 then has half periods determined by the intersections of the output of error amplifier 103 and the sawtooth wave from waveforming circuit 93. Again, waveform 6H and 6I are the output waveforms that would be realized by utilizing the outputs of modulator 61 and modulator 63, respectively, exclusively. The actual output voltage waveform then appears as waveform 6J.

In order to provide the proper excitation for induction generator 11, waveform 6J should be leading, but at less than maximum phase angle. Thus, it would be expected that the current components utilized would produce more current having a greater leading phase angle than lagging phase angle, but there would be some current components that would lag the corresponding voltages. Analysis of waveform 6J reveals that the phase angle of the current drawn from induction generator 11 would, for the case illustrated, lead the generated voltage by the requisite phase angle to provide the necessary excitation of the induction generator.

In order to further comprehend the operation of the present invention in properly exciting an induction generator, assume that a synchronous generator is connected in parallel with induction generator 11 in FIG. 1. The synchronous generator is to provide the reactive power for excitation of induction generator 11, as in that prior art type of device. Assume further that the frequency changer 29 is set so as to produce a unity input power factor. In this case, the current drawn from induction generator 11 by frequency changer 29 is real, being in phase with the corresponding terminal voltage. In other words, no reactive energy exchange takes place between the induction generator and the load. If the speed of the induction generator or the frequency of the synchronous generator is set in such a fashion that the frequencies of the induction generator and synchronous generator outputs are identical, then the synchronous generator can be said to provide all reactive power while the induction generator is providing all real power. If control circuit 31 is then set to produce a slightly leading input power factor, the reactive current of the synchronous generator is decreased, since some of the excitation of induction generator 11 now results from the fact that the change in the input power factor makes the frequency changer 29 appear as a capacitive load. Continuing in this fashion, the excitation current provided by the synchronous generator can be decreased and the synchronous generator may be removed from the circuit. Thus, the induction generator arrangement becomes self sufficient and it is only necessary to alter the input power factor in order to properly excite the induction generator to correct for changes in the load or changes in the speed at which the induction generator is driven.

It should be understood that various modifications, changes and variations may be made in the arrangements, operations and details of construction of the elements disclosed herein without departing from the spirit and scope of the present invention.

I claim:

1. An electrical power generating arrangement comprising:
   an induction generator;

signal handling means adapted to form a desired output voltage from the signal generated by said induction generator and to establish the phase angle of the current drawn from said induction generator without affecting the phase angle of the output current of said signal handling means; and adjusting means operatively connected to said signal handling means to control the phase angle established by said signal handling means for the current drawn from said induction generator in such a fashion as to provide an excitation current for said induction generator that results in said induction generator generating a signal that permits said signal handling means to form the desired output voltage and to provide the requisite output current, said adjusting means comprising control means connected to cause said signal handling means to establish the phase angle for the current drawn from said induction generator at a value such as to provide maximum excitation for said induction generator during starting and to provide an excitation that causes said induction generator to generate a voltage having a desired amplitude during steady state conditions.

2. An electrical generating arrangement as claimed in claim 1 wherein said control means comprises:
generator voltage reference means providing a signal indicative of a desired amplitude for the voltage generated by said induction generator;
voltage detection means providing a signal indicative of the actual amplitude of the voltage generated by said induction generator;
error means producing a signal indicative of the difference between the signal provided by said generator voltage reference means and said voltage detection means; and
comparing means responsive to the signal produced by said error means to cause the phase angle of the current drawn from said induction generator to be set at a value such that said induction generator is excited to generate a voltage that results in the difference between the signals provided by said generator voltage reference means and said voltage detection means tending to zero.

3. An electrical power generating arrangement as claimed in claim 2 wherein said control means further comprises load current responsive means producing a signal indicative of actual signal handling means output current frequency and phase during normal operation and of simulated signal handling means output current frequency and phase during starting to provide another input to said comparing means, said comparing means being responsive to the relationship between the signals from the said load current responsive means and said error means.

4. An electrical power generating arrangement comprising:
an induction generator;
signal handling means adapted to form a desired output voltage from the signal generated by said induction generator and to establish the phase angle of the current drawn from said induction generator without affecting the phase angle of the output current to said signal handling means; and
adjusting means operatively connected to said signal handling means to control the phase angle established by said signal handling means for the current drawn from said induction generator in such a fashion as to provide an excitation current for said induction generator that results in said induction generator generating a signal that permits said signal handling means to form the desired output voltage and to provide the requisite output current, said adjusting means comprising:
first control means to determine the phase angle of the current drawn from said induction generator;
second control means to determine the magnitude and frequency of the output voltage of said signal handling means; and
actuating means responsive to signals from said first and second control means to cause said signal handling means to establish the phase angle determined by said first control means for the current drawn from said induction generator and to provide a voltage having the magnitude and frequency determined by said second control means for the load.

5. An electrical power generating arrangement as claimed in claim 4 wherein said first control means comprises:
error means producing a signal indicative of the difference between the amplitude of the voltage generated by said induction generator and a predetermined desired amplitude thereof;
load current responsive means producing a signal indicative of actual signal handling means output current frequency and phase during normal operation and of simulated signal handling means output current frequency and phase during starting; and
comparing means responsive to the signals from said error means and said load current responsive means to provide a signal for said actuating means that determines the phase angle of the current drawn from said induction generator.

6. An electrical power generating arrangement as claimed in claim 5 wherein said first control means further comprises:
generator voltage reference means providing a signal for said error means indicative of a desired amplitude for the voltage generated by said induction generator; and
voltage detection means providing a signal for said error means indicative of the actual amplitude of the voltage generated by said induction generator.

7. An electrical power generating arrangement as claimed in claim 5 wherein said load current responsive means comprises:
simulating means to provide a signal representing a load current for a capacitive load only when there is an absence of actual load current;
output current detection to provide a signal indicative of the output current of said signal handling means;
summing means to combine the signals from said simulating means and said output current detection means; and
wave forming means to provide a signal to be applied to said comparing means in response to the output of said summing means.

8. An electrical power generating arrangement as claimed in claim 7 wherein said simulating means comprises:

load current detection means producing a signal indicative of the load current;
gate means responsive to the signal produced by said load current detection means; and
source means producing a signal simulating a load current for a capacitive load, said gate means passing the signal of said source means only when said load current detection means indicates the absence of a load current.

9. An electrical power generating arrangement as claimed in claim 4 and further comprising output voltage reference means that provides a signal indicative of the desired output voltage amplitude and frequency.

10. An electrical power generating arrangement as claimed in claim 9 wherein said second control means comprises:
first modulating means to produce a signal indicative of the voltage generated by said induction generator as modulated by the signal of said output voltage reference means; and
second modulating means to produce a signal indicative of the voltage generated by said induction generator as modulated by the signal of said output voltage reference means, the signals produced by said first and second modulating means being indicative of complementary wave shapes.

11. An electrical power generating arrangement as claimed in claim 10 wherein said actuating means comprises first and second AND gates, the signal from said first modulating means being applied to said first AND gate and the signal from said second modulating means being applied to said second AND gate.

12. An electrical power generating arrangement as claimed in claim 11 wherein said first control means comprises:
error means producing a signal indicative of the difference between the amplitude of the voltage generated by said induction generator and a predetermined desired amplitude thereof;
load current responsive means producing a signal indicative of actual signal handling means output current frequency and phase during normal operation and of simulated signal handling means output current frequency and phase during starting;
comparing means responsive to the signals from said error means and said load current responsive means to provide a signal for determining the phase angle of the current drawn from said induction generator; and
inverting means, the signal from said comparing means being conveyed to said first AND gate and to said inverting means, the output of said inverting means being conveyed to said second AND gate.

13. An electrical power generating arrangement comprising:
an induction generator that generates a plurality of phase displaced voltages;
a plurality of bidirectional electrical switches, one for each of the phase displaced voltages generated by said induction generator, the voltages passed by said switches being combined to form a desired output voltage;
a filter circuit through which the output voltage of said bidirectional switches is passed to a load;
simulating means to provide a signal representing the load current for a capacitive load only when there is an absence of actual load current;
output current detection means to provide a signal indicative of the output current of said bidirectional switches;
summing means to combine the signals from said simulating means and said output current detection means;
wave forming means receiving the signal from said summing means to provide a signal having a predetermined wave shape based upon the frequency and phase of the actual or simulated output current of said bidirectional switches;
error means producing a signal indicative of the difference between the amplitude of the voltages generated by said induction generator and a predetermined desired amplitude thereof;
comparing means responsive to the signals from said error means and said wave forming means to provide a signal determinative of the phase angle of the current drawn from said induction generator;
control means to produce a signal determinative of the magnitude and frequency of the output voltage of said bidirectional switches; and
actuating means responsive to the signals from said comparing means and said control means to cause said bidirectional switches to be selectively opened at appropriate times to form an output voltage having the desired frequency and magnitude and to cause the current drawn from said induction generator to have the requisite phase angle, regardless of the phase angle of the output current of said bidirectional switches.

14. An electrical power generating arrangement as claimed in claim 13 and further comprising:
output voltage reference means to provide a signal indicative of the desired output voltage amplitude and frequency, such signal being applied to said control means and said simulating means;
generator voltage reference means providing a signal for said error means indicative of a desired amplitude for the voltages generated by said induction generator;
voltage detection means providing a signal for said error means indicative of the actual amplitude of the voltages generated by said induction generator; and
inverting means having the signal from said comparing means applied thereto, both the signal from said comparing means and the signal from said inverting means being applied to said control means.

15. An electrical power generating arrangement as claimed in claim 14 wherein said simulating means comprises:
load current detection means producing a signal indicative of the load current;
integrating means to convert the signal from said output voltage reference means into a representation of the current that would be produced if the signal from said output voltage reference means were applied to a capacitive load; and
gate means responsive to the signal produced by said load current detection means to pass the signal from said integrating means to said summing means only when said load current detection means indicates the absence of a load current.

16. An electrical power generating arrangement as claimed in claim 15 wherein said control means comprises:

first modulating means to produce a signal indicative of selected portions of the voltage generated by said induction generator to be used to construct an output voltage of said bidirectional switches having the amplitude and frequency indicated by said output voltage reference means; and second modulating means to produce a signal indicative of selected portions of the voltages generated by said induction generator to be used to construct an output voltage having the magnitude and frequency indicated by said output voltage reference means, the signals of said first and second modulating means being indicative of complementary wave shapes.

17. An electrical power generating arrangement as claimed in claim 16 wherein said actuating means comprises:

first and second AND gates, the signal from said first modulating means being applied to said first AND gate and the signal from said second modulating means being applied to said second AND gate; and switch energizing means responsive to the signals from said first and second AND gates to open appropriate ones of said bidirectional switches.

18. An electrical power generating arrangement as claimed in claim 17 wherein:

said wave forming means produces a sawtooth signal having a period determined by the crossover points of the actual output current during normal operation and of the simulated load current during starting;

said error means produces a signal having a constant magnitude for relatively long time periods;

said comparing means produces a square wave with transition points corresponding to the intersections of the signal from said error means and the sawtooth signal from said wave forming means, the square wave from said comparing means being applied to said first AND gate and the inverted square wave from said inverting means being applied to said second AND gate, whereby the signals from said first and second modulating means and from said comparing means and said inverting means cause said switch energizing means to open appropriate ones of said bidirectional switches to produce an output voltage having the desired magnitude and frequency and to cause the current drawn from said induction generator to have a phase angle such as to provide the requisite excitation for said induction generator.

19. A control arrangement for self-excitation of an induction generator comprising:

signal handling means adapted to pass the signal generated by the induction generator to a load and to establish the phase angle of the current drawn from the induction generator without affecting the phase angle of the output current of said signal handling means; and adjusting means operatively connected to said signal handling means to control the phase angle established by said signal handling means for the current drawn from the induction generator in such a fashion as to provide an excitation current for the induction generator that results in the induction generator generating a voltage having a predetermined amplitude in spite of changing load requirements, said adjusting means comprising:

output current detection means to provide a signal indicative of the output current of said signal handling means;

simulating means to provide a signal representing the load current for a capacitive load only when there is an absence of actual load current;

summing means to combine the signals from said simulating means and said output current detection means;

wave forming means receiving the signal from said summing means to provide a signal having a predetermined wave shape based upon the frequency and phase of the actual or simulated output current of said signal handling means;

error means producing a signal indicative of the difference between the amplitude of the voltage generated by the induction generator and a predetermined desired amplitude thereof;

comparing means responsive to the signals from said error means and said wave forming means to provide a signal determinative of the phase angle of the current drawn from the induction generator;

control means to produce a signal determinative of the magnitude and frequency of the output voltage of said signal handling means; and actuating means responsive to the signals from said comparing means and said control means to cause said signal handling means to form an output voltage having the desired frequency and magnitude and to cause the current drawn from the induction generator to have the requisite phase angle, regardless of the phase angle of the output current of said signal handling means.

20. A control arrangement as claimed in claim 19 wherein:

said signal handling means comprises a plurality of bidirectional electrical switches corresponding in number to a plurality of phase displaced voltages generated by the induction generator, the voltages passed by said switches being combined to form a desired output voltage;

a filter circuit is arranged to pass the output voltage of said bidirectional switches to the load;

an output voltage reference means provides a signal indicative of the desired output voltage amplitude and frequency, such signal being applied to said control means and to said simulating means;

said simulating means converts the signal from said output voltage reference means into a signal representing the current that would be produced if the signal from said output voltage reference means were applied to a capacitive load;

said wave forming means produces a sawtooth signal having a period determined by the crossover points of the actual output current during normal operation and of the simulated load current during starting;

said error means produces a signal having a constant magnitude for relatively long time periods;

said comparing means producing a square wave with transition points corresponding to the intersections of the signal from said error means and the sawtooth signal from said wave forming means;

inverting means has the square wave of said comparing means applied thereto;

said control means comprises first and second modulating means responsive to the signal from said output voltage reference means to produce complementary signals indicative of selected portions of the voltages generated by the induction generator to be used to construct an output voltage of said bidirectional switches having the amplitude and frequency indicated by said output voltage reference means; and said actuating means comprises first and second AND gates, the signals from said first modulating means and said comparing means being applied to said first AND gate and the signals from said second modulating means and said inverting means being applied to said second AND gate, the signals from said first and second AND gates causing appropriate ones of said bidirectional switches to be opened.

21. A method of generating electrical power employing an induction generator comprising:

determining a phase angle for the current drawn from the induction generator that would produce an excitation current such as to cause the induction generator to generate a desired signal;

selecting portions of the signal generated by the induction generator that would provide a current having the determined phase angle for a given output current; and forming an output voltage having desired frequency and amplitude characteristics from the selected portions of the signal generated by the induction generator, said step of determining a phase angle for the current drawn from the induction generator comprising:

detecting the phase of the output current;

producing a direction signal incorporating the phase of the output current;

producing an error signal representing the difference between a desired amplitude for the voltage generated by the induction generator and the actual amplitude of the voltage generated by the induction generator; and comparing the detection signal and the error signal to yield an indication of the needed phase angle for the current drawn from the induction generator.

22. A method of generating electrical power employing an induction generator that generates a plurality of phase displaced voltages comprising:

generating a reference voltage having the amplitude and frequency desired for the output voltage;

integrating the reference voltage to simulate the current that would be drawn by a purely capacitive load;

summing the integrated reference voltage and the total output current;

preventing the integrated reference voltage from being summed unless there is no load current;

producing a sawtooth wave having a period and phase determined by the sum of the output current and the integrated reference voltage;

providing an amplitude reference indicative of the desired amplitude of the voltages generated by the induction generator;

producing an error signal representing the difference between the desired amplitude and the actual amplitude;

comparing the error signal and the sawtooth wave to produce a square wave having a period and phase determined by the intersections of the error signal and sawtooth wave;

inverting the square wave to provide two identical square waves having reverse polarities;

modulating the phase displaced voltages generated by the induction generator with the reference voltage to produce pulses representing the portions of the phase displaced voltages utilized to construct two complementary wave shapes having the frequency and amplitude determined by the reference voltage;

normally blocking the pulses representing the complementary wave shapes passing the pulses representing only one of the complementary wave shapes as determined by the square waves of reverse polarities; and actuating switches in response to the pulses passed to form an output voltage having the desired frequency and amplitude and to draw current from the induction generator having a phase angle such as to properly excite the induction generator.

23. A method of generating electrical power employing an induction generator comprising:

determining a phase angle for the current drawn from the induction generator that would produce an excitation current such as to cause the induction generator to generate a desired signal;

selecting portions of the signal generated by the induction generator that would provide a current having the determined phase angle for a given output current; and forming an output voltage having desired frequency and amplitude characteristics from the selected portions of the signal generated by the induction generator, said step of selecting portions of the signal generated by the induction generator comprising:

modulating the signal generated by the induction generator to produce pulses indicative of complementary wave shapes, both wave shapes having the frequency and amplitude of the desired output voltage but constructed of differing portions of the signal generated by the induction generator; and grating means to pass certain ones of the pulses resulting from modulation of the signal generated by the induction generator as required for the phase angle determined for the current drawn from the induction generator.

* * * * *